United States Patent Office 3,578,625
Patented May 11, 1971

3,578,625
STABILIZED COMPOSITION OF POLYPHENYLENE OXIDE
Seizo Nakashio, Nishinomiya-shi, and Isao Maruta, Ibaragi-shi, Japan, asssignors to Sumitomo Chemical Company, Ltd., Osaka, Japan
No Drawing. Filed Aug. 29, 1968, Ser. No. 756,317
Claims priority, application Japan, Sept. 2, 1967, 42/56,507
Int. Cl. C08g 51/62
U.S. Cl. 260—45.75    8 Claims

ABSTRACT OF THE DISCLOSURE

The present composition of polyphenylene oxide has an improved stability against deterioration of quality and in discoloration, and comprises a polyphenylene oxide, 0.005 to 5% by weight of at least one kind of hindered phenol and 0.005 to 5% by weight of at least one member selected from the group consisting of trialkyl phosphites, triaryl phosphites, trialkyl thiophosphites, triaryl thiophosphites, thiophosphites, thioethers of carboxylic acid esters, thioethers, metal alkyldithiocarbamates and metal aryldithiocarbamates.

---

The present composition can be used as raw materials for the production of parts of various appliances including electric appliances, films, filaments, tapes and other molded articles.

This invention relates to a stabilized composition of polyphenylene oxide and more particularly a stabilized composition of high molecular weight polyphenylene oxide containing a plurality of stabilizers having a synergetic action for preventing or considerably decreasing the deterioration and discoloration of the polymer particularly due to oxidation and heat.

It is well known that polyphenylene oxide has good physical and chemical properties and application of polyphenylene oxide to various uses, for example, parts of appliances including electrical ones, film, filaments, tapes and other ordinary molded articles has been heretofore proposed.

However, it is known that the polyphenylene oxides tend to be discolored by thermal oxidation. Such deterioration in quality is obviously due to formation of free radicals in the polymers. Further, it is known that the formation of such free radicals is accelerated by oxygen or ozone and catalytically promoted by heat, ultraviolet rays and impurities such as a metal or metallic compound. The free radicals so formed undergo chemical reaction with the polymers themselves, and as a result undesirable changes in chemical and physical properties are brought about, the polyphenylene oxide compounds being thereby deteriorated and discolored. The conventional polyphenylene oxides have such a tendency that the quality is deteriorated while undergoing processing or use, and thus it is necessary to add a stabilizer to the polymer to prevent or decrease such deterioration.

It has been heretofore known from Dutch Pat. No. 6,507,599 that 2-mercaptobenzimidazoles are effective as a stabilizer for polyphenylene oxide, and further from French Pat. No. 1,463,578 that the use of hydrazines, phosphites or the simultaneous use of hydrazines and phosphites is effective for stabilization of polyphenylene oxide.

As a result of research, the present inventors have found that in order to give good stability to the polyphenylene oxide, some combinations of specific stabilizers with the polyphenylene oxide are very effective due to their synergetic effect, even if very small amounts of stabilizers are added thereto.

According to the present invention, a combination of stabilizers consisting of (a) at least one kind of hindered phenol and (b) at least one member selected from the group consisting of trialkyl- or triaryl phosphites, trialkyl- or triaryl thiophosphites, thioethers of carboxylic acid esters, thioethers, and metal alkyl- or metal aryldiothiocarbamates are effective in giving a good stability to the polyphenylene oxide.

The present invention is to provide a stabilized composition of polyphenylene oxide consisting of a polyphenylene oxide having a structure as represented by the formula,

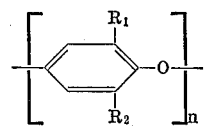

wherein $R_1$ and $R_2$ represent hydrogens, halogens, hydrocarbon groups, substituted hydrocarbon groups, cyano groups, alkoxy groups, phenoxy groups, nitro groups, amino groups or sulfo groups, and $n$ is an integer at least equal to 100; (a) 0.005 to 5% by weight of at least one kind of hindered phenol on the basis of the weight of the polyphenylene oxide; and (b) 0.005 to 5% by weight based on the weight of the polyphenylene oxide of at least one member selected from the group consisting of trialkyl- or triaryl phosphites as represented by the formula:

wherein $R_1$ and $R_2$ represent hydrocarbon groups or their derivatives having 6 to 20 carbon atoms respectively; trialkyl- or triaryl thiophosphites as represented by the formula:

wherein $R_1$, $R_2$ and $R_3$ represent hydrocarbon groups or their derivatives having 6 to 20 carbon atoms respectively; thioethers of carboxylic acid esters as represented by the formula:

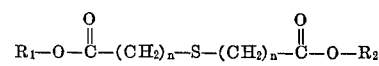

wherein $R_1$ and $R_2$ represent hydrocarbon groups having 6 to 20 carbon atoms respectively, and $n$ is an integer of 1 to 20, preferably 1 to 6; thioethers as represented by the general formula:

$$R_1-S-R_2$$

wherein $R_1$ and $R_2$ represent hydrocarbon groups or their derivatives having 6 to 20 carbon atoms respectively; and metal alkyl- or metal aryldithiocarbamates as represented by the formula:

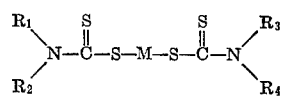

wherein $R_1$, $R_2$, $R_3$ and $R_4$ represent hydrocarbon groups having 1 to 20 carbon atoms, preferably not more than 4 carbon atoms respectively, and M is zinc, cadmium or nickel.

The hindered phenols used in the present invention includes monophenols as represented by the formula:

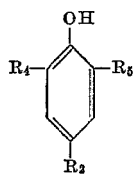

wherein $R_4$ and $R_5$ represent hydrocarbon groups having 1 to 20 carbon atoms, and $R_2$ represents a hydrogen or a hydrocarbon group having 1 to 20 carbon atoms; bisphenols as represented by the formula:

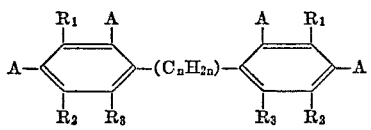

wherein $R_1$, $R_2$ and $R_3$ each represent a hydrogen atom or a hydrocarbon group having 1 to 20 carbon atoms; one of symbols A attached to each ring represents a hydroxyl group and the remaining symbol A represents a hydrocarbon group having 1–20 carbon atoms or a hydrogen; and $n$ is an integer of 0 (zero) to 20; trisphenols as represented by the formula:

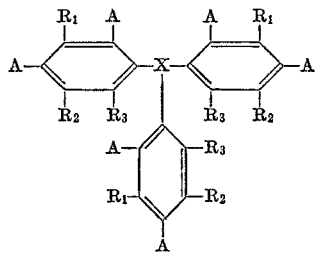

wherein $R_1$, $R_2$, and $R_3$ each represent a hydrogen atom or hydrocarbon groups of 1 to 20 carbon atoms; one of symbols A attached to each ring represents a hydroxyl group and the remaining symbol A represents a hydrocarbon group having 1 to 20 carbon atoms or a hydrogen; and X represents a trivalent hydrocarbon group having 1 to 20 carbon atoms; trisphenols as represented by the formula:

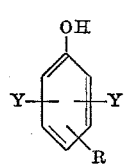

wherein R represents a hydrocarbon group having 1 to 20 carbon atoms; and Y represents groups as represented by the formula:

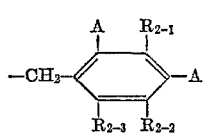

wherein $R_{2-1}$, $R_{2-2}$ and $R_{2-3}$ each represent hydrocarbon groups having 1 to 20 carbon atoms or hydrogens, and one of symbols A is a hydroxyl group and the remaining symbol A represents a hydrocarbon group having 1 to 20 carbon atoms or hydrogen; and thiobisphenols as represented by the formula:

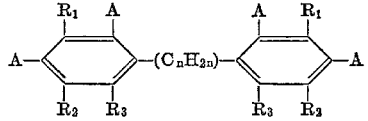

More concretely, examples of the hindered monophenols include 2-methyl-6-tertiary-butylphenol;
2,6-di-tertiary-butylphenol;
2,6-di-tertiary-butyl-p-cresol;
2,6-dicyclohexyl-p-cresol;
2,6-diisopropyl-4-ethylphenol;
2,6-di-tertiary-amyl-p-cresol;
2,6-di-tertiary-octyl-4-n-propylphenol;
2,6-dicyclohexyl-4-n-octylphenol;
2-isopropyl-4-methyl-6-tertiary-butylphenol;
2-isobutyl-4-ethyl-6-tertiary-hexylphenol;
2-tertiary-butyl-4-ethyl-6-tertiary-octylphenol;
2-cyclohexyl-4-n-butyl-6-isopropylphenol;
and 2,6-di-tertiary-butyl-4-laurylphenol.

In the case that the 4-position is occupied with an alkyl group, it is preferable that the alkyl group consists of 1 to 20 carbon atoms. Further, it is preferable that the alkyl groups at the 2- and 6-positions are secondary alkyl groups, tertiary alkyl groups or cyclic hydrocarbon groups of 3 to 20 carbon atoms.

Examples of the hindered bisphenols include 2,2'-methylenebis(4-methyl-6-tertiary-butylphenol);
4,4'-isopropylidenbis(2-tertiary-butylphenol);
4,4'-methylenebis(2,6-di-tertiary-butylphenol);
2,2'-methylenebis(p-cresol);
2,2'-methylenebis(4,6-dimethylphenol);
4,4'-methylenebis(6-tertiary-butyl-o-cresol);
2,2'-ethylidenbis(4,6-dimethylphenol);
2,2'-ethylidenebis(4-methyl-6-butylphenol);
4,4'-bis(2-methyl-6-tertiary-butylphenol);
4,4'-bis(2,6-di-tertiary-butylphenol);
and 2,2'-bis(4-methyl-6-tertiary-butylphenol).

Examples of the hindered trisphenols include 1,1,3-tris(3-tertiary-butyl-4-hydroxyphenyl)butane;
1,1,3-tris(2-methyl-4-hydroxy-5-tertiary-butylphenyl)-butane;
2,6-di(2-hydroxy-5-methylbenzyl)-4-methylphenol;
2,6-di(4-hydroxybenzyl)-4-methylphenol;
2,6-di(2-hydroxy-3-tertiary-butyl-5-methylbenzyl)-4-methylphenol;
and 2,6-di(2-hydroxy-3-tertiary-butyl-5-methylbenzyl) 4-nonylphenol.

Examples of the thiobisphenols include 2,2'-thiobis(4-methyl-6-tertiary-butylphenol);
2,2'-thiobis(4-iospropyl-6-tertiary-butylphenol);
4,4'-thiobis(3-methyl-6-tertiary-butylphenol);
and 4,4'-thiobis(3-methyl-6-tertiary-amylphenol).

Examples of the trialkyl- or triaryl phosphites include tri(nonylphenyl)phosphite trilaurylphosphite, tristearyl phosphite, tribenzyl phosphite, tricyclohexyl phosphite, tripalmityl phosphite, tri(2-ethylhexyl)phosphite, tri(2,4-ditertiary-butyl-5-methylphenyl)phosphite, etc.

Examples of the trialkyl trithiophosphites include trilauryl trithiophosphite, tristearyl trithiophosphite, tribenzyl trithiophosphite, tricyclohexyl trithiophosphite, tripalmityl trithiophosphite, etc.

Examples of the thioethers of carboxylic acid esters include dilauryl thiodipropionate, distearyl thiodipropionate, dihexyl thiodibutyrate, dibutyl thiodicaproate, etc.

Examples of the thioethers include dihexadecyl sulphite, dibenzyl sulphide, dicyclohexyl sulphide, dieicosyl sulphide, didecyl sulphide, diphenyl sulphide, etc.

Examples of the metal alkyl- or metal aryldithiocarbamates include zinc dimethyldithiocarbamate, zinc diethyldithiocarbamate, zinc dibutyldithiocarbamate, cadmium dimethyldithiocarbamate, cadmium diethyldithiocarbamate, cadmium dibutyldithiocarbamate, zinc ethylphenyldithiocarbamate, and zinc diphenyldithiocarbamate.

It is sometimes preferable to further add a metallic soap to a combination of stabilizers consisting of at least one member selected from the above-mentioned group (a) and at least one member selected from the above-mentioned group (b).

Examples of the metallic soaps to be used include soaps of calcium, barium, zinc, cadmium, and aluminum. More concretely, they include calcium stearate, zinc stearate, barium stearate, cadmium stearate, aluminum stearate, calcium laurate, zinc laurate, cadmium laurate, aluminum laurate, calcium myristate, barium myristate, zinc naphthenate, barium naphthenate, etc.

In order to give a high stability to the polyphenylene oxide compound, it is necessary to add the present stabilizers thereto. There is no restriction to the amounts of the present stabilizers to be added, so long as the present stabilizer is added in the ordinary amount in which ordinary stabilizers are added.

Usually, it is preferable to add into the polyphenylene oxide at least one kind of the hindered phenols of the group (a) and at least one member selected from the group (b), respectively, by 0.005 to 5% by weight on the basis of the polymer.

Each component of the stabilizers can be added to the polyphenylene oxide in any manner. For example, the polyphenylene oxide compound is heated to a temperature higher than its melting point, and mixed with the stabilizers on a hot roll or is mixed therewith in a Banbury mixer.

In another manner, the stabilizers in solid or molten state are added to a solution or suspension of the polyphenylene oxide polymer in a suitable liquid carrier, and then said liquid carrier is removed therefrom by evaporation, whereby the desired composition is obtained. In another manner, the stabilizers are added to a polymerization reaction mixture prior to the precipitation of polyphenylene oxide with its non-solvent. In that case, it is desirable to use increased amounts of stabilizers. In still another manner, the stabilizers are dissolved in a solvent and mixed with a powdery polyphenylene oxide, and then the solvent is removed by evaporation, whereby the desired composition is obtained.

The polyphenylene oxide used in the present invention has a structure represented by the general formula:

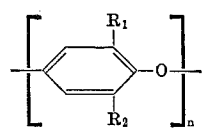

wherein $R_1$ and $R_2$ represent hydrogens, halogens, hydrocarbon groups or substituted hydrocarbon groups, cyano groups, alkoxy groups or phenoxy groups, nitro groups, amino groups or sulpho groups, and $n$ is an integer at least equal to 100.

More concretely, $R_1$ and $R_2$ represent hydrogens, chlorines, bromines, iodines, methyl groups, ethyl groups, propyl groups, allyl groups, phenyl groups, benzyl groups, methylbenzyl groups, chloromethyl groups, bromomethyl groups, cyanoethyl groups, cyano groups, methoxy groups, ethoxy groups, phenoxy groups, nitro groups, amino groups, sulpho groups, etc.

More concretely, examples of the polyphenylene oxides include poly-2,6-dimethyl-1,4-phenylene oxide, poly-2,6-diethyl-1,4-phenylene oxide, poly-2,6-dipropyl-1,4-phenylene oxide, poly-2,6-dimethoxy-1,4-phenylene oxide, poly-2,6-dichloromethyl-1,4-phenylene oxide, poly-2,6-dibromomethyl-1,4-phenylene oxide, poly-2,6-dinitrile-1,4-phenylene oxide, poly-2,6-dichloro-1,4-phenylene oxide, etc.

As aforementioned, the thermal stability of polyphenylene oxide is believed to be improved by the introduction of blocking groups which replace the hydroxy end groups on the base polymer.

The present composition acts quite effectively as stabilizers in the use of the polyphenylene oxide of which hydroxy groups are blocked by certain reagents.

In order to evaluate the effect of stabilizers in the present composition, the following procedures have been employed.

(1) Degree of discoloration of a sheet prepared by pressing a composition of the polyphenylene oxide at 270° C. for 5 minutes under a pressure of 100 kg./cm.² was observed visually.

(2) Amount of oxygen absorbed into a film (40 mg.; 10 mm. x 30 mm. x 0.01 mm.) of a composition of the polyphenylene oxide was observed in the process of heating at 160° C. during 3 hours in oxygen atmosphere.

(3) Change in the degree of light absorption of a film of a composition of polyphenylene oxide having a definite thickness at 1710 cm.$^{-1}$ using an infra-red spectrum after being heated under the same conditions as above (2) was determined. The degree of light absorption prior to the heating, $$A_o, \left[ = \left( \log \frac{I_o}{I} \right) o \right]$$

and that after the heating, $$A, \left( = \log \frac{I_o}{I} \right)$$

were compared with each other.

(4) Change in the degree of light absorption at the visible region of a film of a composition of the polyphenylene oxide having a definite thickness, after being heated under the same conditions as above (2), was determined. The degree of light absorption prior to the heating, $$A_o \left[ = \left( \log \frac{I_o}{I} \right) o \right]$$

and that after the heating, $$A, \left( = \log \frac{I_o}{I} \right)$$

were compared with each other.

REFERENCE EXAMPLES

Stabilities of non-stabilized polyphenylene oxide and polyphenylene oxide containing only one kind of stabilizer were determined and are shown in Table 1.

The polyphenylene oxide used in the reference examples was poly-(2,6-dimethyl-1,4-phenylene oxide) having a molecular weight of 50,000 and a melting point of 235° C.

TABLE 1

| Reference Example No. | Stabilizer | Amount added, percent by weight | Degree of discoloration | Absorption of oxygen, ml./g. polymer | $A_0/A_0$ (infrared) | $A_0/A_0$ (visible light) |
|---|---|---|---|---|---|---|
| 1 | None | | Reddish brown | 0.45 | 2.2 | 3.4 |
| 2 | 2,6-di-t-butyl-p-cresol | 0.2 | do | 0.40 | 2.2 | 3.0 |
|   |   | 0.4 | do | 0.40 | 2.2 | 3.0 |
| 3 | 2,2'-methylenebis(4-methyl-6-t-butylphenol) | 0.2 | do | 0.40 | 2.1 | 3.1 |
|   |   | 0.4 | do | 0.39 | 2.0 | 3.0 |
| 4 | 1,1,3-tris(2-methyl-4-hydroxy-5-t-butylphenyl)butane | 0.2 | do | 0.40 | 2.2 | 3.0 |
|   |   | 0.4 | do | 0.40 | 2.0 | 3.0 |
| 5 | 2,6-di(2-hydroxy-3-t-butyl-5-methylbenzyl)-4-methylphenol | 0.2 | do | 0.44 | 2.0 | 3.0 |
|   |   | 0.4 | do | 0.43 | 2.0 | 3.0 |
| 6 | 4,4'-thiobis(3-methyl-6-t-butylphenol) | 0.2 | do | 0.40 | 2.1 | 3.3 |
|   |   | 0.4 | do | 0.39 | 2.0 | 3.0 |
| 7 | Tri(nonylphenyl)phosphite | 0.2 | do | 0.40 | 2.1 | 3.0 |
|   |   | 0.4 | do | 0.39 | 2.0 | 3.0 |
| 8 | Trilauryl trithiophosphite | 0.2 | do | 0.40 | 2.1 | 3.1 |
|   |   | 0.4 | do | 0.39 | 2.1 | 3.1 |
| 9 | Dilauryl thiodipropionate | 0.2 | do | 0.40 | 2.2 | 3.0 |
|   |   | 0.4 | do | 0.39 | 2.0 | 3.0 |
| 10 | Didecyl sulphide | 0.2 | do | 0.40 | 2.0 | 3.0 |
|   |   | 0.4 | do | 0.39 | 2.1 | 3.0 |
| 11 | Zinc dibutyldithiocarbamate | 0.2 | do | 0.43 | 2.1 | 3.3 |
|   |   | 0.4 | do | 0.42 | 2.0 | 3.2 |
| 12 | Calcium stearate | 1.0 | Yellowish brown | 0.43 | 2.2 | 3.2 |
| 13 | 2,6-ditertiarybutylphenol | 0.2 | Reddish brown | 0.38 | 2.0 | 2.9 |
|   |   | 0.4 | do | 0.36 | 2.0 | 2.8 |
| 14 | 4,4'-bis(2,6-ditertiary-butylphenol) | 0.2 | do | 0.38 | 1.9 | 2.8 |
|   |   | 0.4 | do | 0.35 | 1.8 | 2.8 |
| 15 | 4,4'-methylenebis(2,6-ditertiarybutylphenol) | 0.2 | do | 0.38 | 1.9 | 2.8 |
|   |   | 0.4 | do | 0.37 | 1.7 | 2.7 |

In addition to stabilizers, pigments, dyestuff or fillers can be added to the present composition, or other polymeric substances can be added thereto to improve the properties of the polyphenylene oxide.

The following examples are merely illustrative of the present invention, and the present invention is not restricted to said examples.

EXAMPLES

Stabilization results of the composition of the polyphenylene oxide containing the hindered phenol of the group (a) and the compound of the group (b) are given in Table 2.

What we claim is:

1. A composition of polyphenylene oxide consisting of a polyphenylene oxide having a structure as represented by the formula:

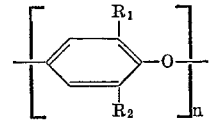

wherein $R_1$ and $R_2$ represent hydrogens, halogens, hydrocarbon groups, substituted hydrocarbon groups, cyano groups, alkoxy groups, phenoxy groups, nitro groups,

TABLE 2

| Example No. | Stabilizer | Amount added, percent by weight | Degree of discoloration | Absorption of oxygen, ml./g. polymer | $A_0/A_0$ (infrared) | $A_0/A_0$ (visible light) |
|---|---|---|---|---|---|---|
| 1 | 2,6-di-t-butyl-p-cresol / Tri(nonylphenyl)phosphite | 0.2 / 0.2 | Light yellow | 0.05 | 1.2 | 1.4 |
| 2 | 2,2'-methylenebis(4-methyl-6-t-butylphenol) / Trilauryl triphosphite | 0.2 / 0.2 | Very pale yellow | 0.04 | 1.2 | 1.1 |
| 3 | 1,1,3-tris(2-methyl-4-hydroxy-5-t-butylphenyl)butane / Dilauryl thiodipropionate | 0.2 / 0.2 | Light yellow | 0.05 | 1.3 | |
| 4 | 2,6-di(2-hydroxy-3-t-butyl-5-methylbenzyl)-4-methylphenol / Didecyl sulphide | 0.2 / 0.2 | Very pale yellow | 0.06 | 1.4 | 1.2 |
| 5 | 4,4-thiobis(3-methyl-6-t-butylphenol) / Zinc dibutyldithiocarbamate | 0.2 / 0.2 | do | 0.03 | 1.3 | |
| 6 | 2,6-di-t-butyl-p-cresol / Trilauryl trithiophosphite | 0.2 / 0.2 | do | 0.04 | 1.3 | 1.2 |
| 7 | 2,2'-methylenebis(4-methyl-6-t-butylphenol) / Dilauryl thiodipropionate | 0.2 / 0.2 | do | 0.06 | 1.4 | 1.3 |
| 8 | 1,1,3-tris(2-methyl-4-hydroxy-5-t-butylphenyl)butane / Didecyl sulphide | 0.2 / 0.2 | do | 0.06 | 1.4 | 1.2 |
| 9 | 2,6-di(2-hydroxy-3-t-butyl-5-methylbenzyl)-4-methylphenol / Zinc dibutyldithiocarbamate | 0.2 / 0.2 | do | 0.05 | 1.3 | 1.2 |
| 10 | 4,4'-thiobis(3-methyl-6-t-butylphenol) / Tri(nonylphenyl)phosphite | 0.2 / 0.2 | do | 0.03 | 1.2 | 1.2 |
| 11 | 2,6-di-t-butyl-p-cresol / Dilauryl thiodipropionate | 0.2 / 0.2 | do | 0.05 | 1.2 | 1.2 |
| 12 | 2,2'methylenebis(4-methyl-6-t-butylphenol) / Didecyl sulphide | 0.2 / 0.2 | do | 0.05 | 1.4 | 1.3 |
| 13 | 1,1,3-tri(2-methyl-4-hydroxy-5-t-butylphenyl)butane / Zinc dibutyldithiocarbamate | 0.2 / 0.2 | do | 0.06 | 1.3 | 1.3 |
| 14 | 2,6-di(2-hydroxy-3-t-butyl-5-methylbenzyl)-4-methylphenol / Tri(nonylphenyl)phosphite | 0.2 / 0.2 | do | 0.05 | 1.3 | 1.2 |
| 15 | 4,4'-thiobis(3-methyl-6-t-butylphenol) / Trilauryl trithiophosphite | 0.2 / 0.2 | do | 0.03 | 1.2 | 1.1 |
| 16 | 4,4'-bis(2,6-di-t-butylphenol) / Trilauryl phosphite / Calcium stearate | 0.2 / 0.2 / 1.0 | do | 0.03 | 1.2 | 1.2 |
| 17 | 2,6-ditertiary-butylphenol / Tri(nonylphenyl)phosphite | 0.2 / 0.2 | Light yellow | 0.05 | 1.2 | 1.3 |
| 18 | 4,4'-bis(2,6-ditertiarybutylphenol) / Tri-lauryl-trithiophosphite | 0.2 / 0.2 | Very pale yellow | 0.04 | 1.2 | 1.3 |
| 19 | 4,4'-methylenebis(2,6-ditertiary-butylphenol) / Di-laurylthio-dipropionate | 0.2 / 0.2 | do | 0.04 | 1.2 | 1.3 | amino groups or sulfo groups and $n$ is an integer at least equal to 100; (a) at least one hindered phenol selected from the group consisting of 2,2'-thiobis(4-methyl-6-tertiary-butylphenol); 2,2''-thiobis(4-isopropyl - 6 - tertiary-butylphenol); 4,4'-thiobis(3-methyl - 6 - tertiary - butylphenol); and 4,4'-thiobis(3-methyl-6-tertiary-amylphenol) and compounds represented by the formulae:

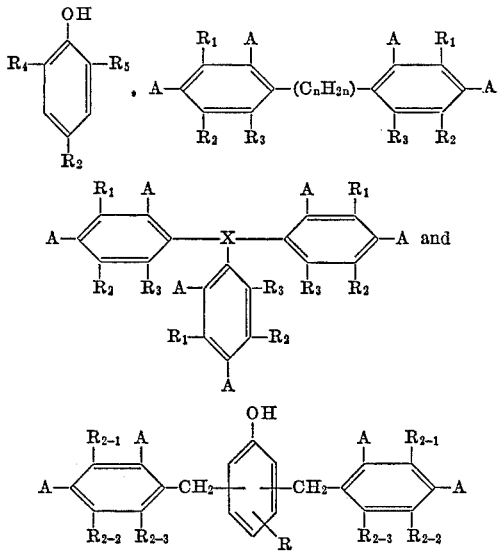

wherein R, $R_4$, and $R_5$ represent a hydrocarbon group having 1 to 20 carbon atoms; $R_1$, $R_2$, $R_3$, $R_{2-1}$, $R_{2-2}$ and $R_{2-3}$ each represent a hydrogen atom or a hydrocarbon group having 1 to 20 carbon atoms; one of the symbol A's attached to each ring represents a hydroxyl group and the other symbol A represents a hydrocarbon group having 1 to 20 carbon atoms or a hydrogen atom; $n$ is an integer of 0 to 20; and X represents a trivalent hydrocarbon group having 1 to 20 carbon atoms, and (b) at least one member selected from the group consisting of phosphites represented by the formula:

wherein $R_1$, $R_2$ and $R_3$ represent hydrocarbon groups having 6 to 20 carbon atoms, and X represents oxygen or sulfur, thioethers represented by the formula:

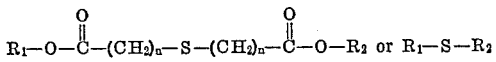

wherein $R_1$ and $R_2$ represent hydrocarbon groups having 6 to 20 carbon atoms, and $n$ is an integer of 1 to 20 and metal dithiocarbamates represented by the formula:

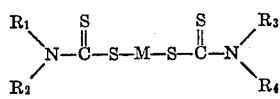

wherein $R_1$, $R_2$, $R_3$ and $R_4$ represent hydrocarbon groups having 1 to 20 carbon atoms, and M is zinc, cadmium or nickel.

2. A composition of polyphenylene oxide according to claim 1, wherein the composition contains 0.005 to 5% by weight based on the weight of the polymer, of each of at least one member from each of groups (a) and (b).

3. A composition according to claim 1 wherein the hindered phenol is a monophenol selected from the group consisting of 2-methyl-6-tertiary-butylphenol;
2,6-ditertiary-butylphenol;
2,6-d-tertiary-butyl-p-cresol;
2,6-dicyclohexyl-p-cresol;
2,6-diisopropyl-4-ethylphenol;
2,6-ditertiary-amyl-p-cresol;
2,6-ditertiary-octyl-4-n-propylphenol;
2,6-dicyclohexyl-4-n-octylphenol;
2-isopropyl-4-methyl-6-tertiary-butylphenol;
2-isobutyl-4-ethyl-6-tertiary-hexylphenol;
2-tertiary-butyl-4-ethyl-6-tertiary-octylphenol;
2-cyclohexyl-4-n-butyl-6-isopropylphenol; and
2,6-di-tertiary-butyl-4-laurylphenol.

4. A composition according to claim 1 wherein the hindered phenol is a bisphenol selected from the group consisting of 2,2'-methylenebis-(4-methyl-6-tertiary-butylphenol);
2,2'-methylenebis-(4-methyl-6-tertiary-butylphenol);
4,4'-isopropylidenbis(2-tertiary-butylphenol);
4,4'-methylenebis(2,6-di-tertiary-butylphenol);
2,2'-methylenebis(p-cresol);
2,2'-methylenebis(4,6-dimethylphenol);
4,4'-methylenebis(6-tertiary-butyl-o-cresol);
2,2'-ethylidenebis(4,6-dimethylphenol);
2,2'-ethylidenebis(4-methyl-6-butylphenol);
4,4'-bis(2-methyl-6-tertiary-butylphenol);
4,4'-bis(2,6-di-tertiary-butylphenol) and
2,2'-bis(4-methyl-6-tertiary-butylphenol).

5. A composition according to claim 1 wherein the hindered phenol is a trisphenol selected from the group consisting of 1,1,3-tris(3-tertiary-butyl-4-hydroxyphenyl)butane;
1,1,3-tris(2-methyl-4-hydroxy-5-tertiary-butylphenyl) butane;
2,6-di(4-hydroxybenzyl)-4-methyl-phenol;
2,6-di(4-hydroxybenzyl)-4-methyl-phenol;
2,6-di(2-hydroxy-3-tertiary-butyl-5-methylbenzyl)-4-methylphenol; and
2,6-di(2-hydroxy-3-tertiary-butyl-5-methylbenzyl)-4-nonylphenol.

6. A composition of polyphenylene oxide according to claim 1, wherein each $R_1$ and $R_2$ of the formula of the polyphenylene oxide is an alkyl having 1 to 10 carbon atoms.

7. A composition of polyphenylene oxide according to claim 1, wherein the hindered phenol is
2,6-ditertiary-butylphenol,
2,6-ditertiary-butyl-p-cresol,
4,4'-bis(2,6-ditertiary-butylphenol),
4,4'-methylenebis(2,6-ditertiary-butylphenol),
1,1,3-tris(2-methyl-4-hydroxy-5-tertiary-butylphenyl) butane or
2,6-di(2-hydroxy-3-tertiary-butyl-5-methylbenzyl)-4-methylphenol.

8. A composition of polyphenylene oxide according to claim 1, wherein the phosphite is tri(nonylphenyl)phosphite, the thiophosphite is trilauryl trithiophosphite, the thioether of a carboxylic acid ester is dilauryl thiodipropionate, the hydrocarbyl thioether is didecyl sulphide and the dithiocarbamate is zinc dibutyldithiocarbamate.

References Cited
UNITED STATES PATENTS 3,388,095   6/1968   Huntjens ........... 260—45.85
3,477,972   11/1969  Kamio et al. ...... 260—45.75

DONALD E. CZAJA, Primary Examiner

V. P. HOKE, Assistant Examiner

U.S. Cl. X.R.

260—45.7, 45.85, 45.95